Sept. 23, 1930.    J. EILAND    1,776,496
MIRROR
Filed Jan. 24, 1928

Inventor
John Eiland,
By J. Stanley Burch
Attorney

Patented Sept. 23, 1930

1,776,496

UNITED STATES PATENT OFFICE

JOHN EILAND, OF TAFT, CALIFORNIA

MIRROR

Application filed January 24, 1928. Serial No. 249,079.

This invention relates to improvements in rear view mirrors for motor vehicles, and has more particular reference to an improved automobile accessory embodying a mirror element having mirrors exposed on opposite faces thereof and adjustably mounted so that either mirror may be presented to the driver of the automobile, one mirror being plain and suitable for use in the daytime, and the other mirror being provided with glare preventing means to render the same suitable for use at night.

Mirrors are at present in common use on motor vehicles for enabling the driver of the vehicle, to ascertain the road and traffic conditions at the rear of the vehicle, while looking ahead. These conventional mirrors are usually of plain glass with an opaque reflecting coat on the back, and while they are quite satisfactory at day, they produce an objectionable and blinding glare when the lights of following automobiles shine thereon at night, causing the drivers to lose control of the automobiles and resulting in serious accidents. To avoid this, the driver must reach up and adjust the mirror so that the reflected light no longer strikes his eyes, and this prevents a further use of the mirror for rear vision purposes until it is again returned to proper position, an adjustment which requires care and a material expenditure of time.

The primary object of the present invention, therefore, is to provide a rear view mirror which may always be left in properly adjusted position for rear vision purposes, and which embodies a mirror element having mirrors proper which are respectively adapted for day and night use, the mirror element being adjustably mounted so that either desired mirror proper may be readily brought to an operative position.

Another object is to provide a reversible mirror element of the above kind and mounting means therefor, which is simple and durable in construction and efficient in use.

Other objects will become apparent as the nature of the invention is better understood, and the same consists in the novel form, combination and arrangement of parts hereinafter more fully described, shown in the accompanying drawing and claimed.

Figure 1:
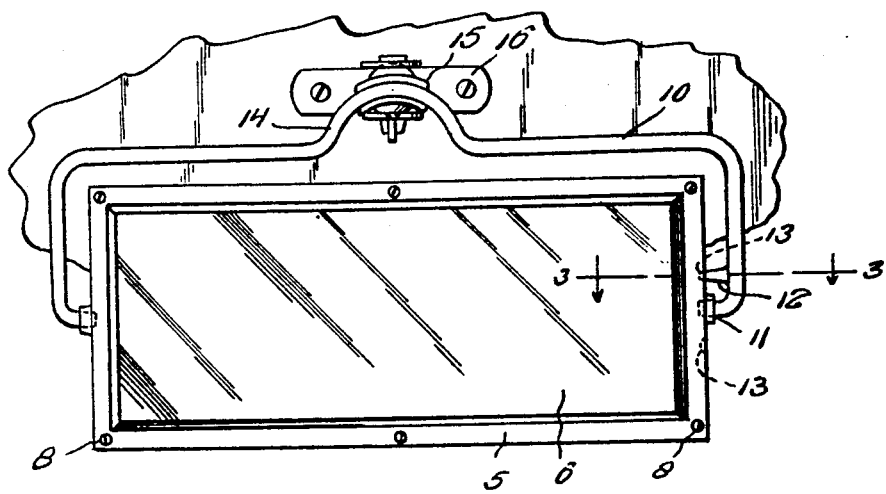
Figure 1 is an elevational view of a rear view mirror embodying the present invention.

Referring more in detail to the drawing, 5 indicates a suitable frame in which a pair of mirrors proper 6 and 7 are mounted and secured, back to back. As shown, the margins of the mirrors are held between a pair of similar frame members held together by screws 8 and formed by centrally dividing the frame parallel with the plane thereof, as at 9.

The mirror 6 is plain and adapted for use at day, while the mirror 7 has glare preventing means and is adapted for use at night. In the preferred form of the invention both mirrors are formed of glass plates having the backs thereof silvered or coated with a reflecting medium, the glass plate of mirror 6 being clear, and the front surface of the glass plate of mirror 7 being smoked or otherwise colored with a translucent medium to permit sufficient vision but to prevent glare of a blinding character due to light shining thereon.

The mirror element is rotatably mounted in a support 10 so as to be capable of being reversed side for side to bring either desired mirror into an operative position. As shown, the support 10 consists of a resilient bail having its ends inturned and journaled, as at 11, in sockets provided centrally of and in the end members of the frame 5. In order to releasably hold the mirror element in an operative position relative to the support when either mirror is in use, the bail 10 has an inwardly projecting catch lug 12 adapted to seat in either of a pair of sockets 13 provided in the adjacent end member of frame 5 at opposite sides of the journal 11. The bail will yield sufficiently to allow the catch lug to snap into the sockets without manual operation of a catch or provision of a catch which is in itself yieldable.

In use, the bail 10 has the upwardly offset central portion 14 thereof held by the clamp 15 of a bracket 16 which is secured to the automobile in front of the driver's seat, generally at the top of the windshield, the bracket having a pair of members relatively adjustable universally to permit setting of the mirror for proper rear vision.

Figure 2:
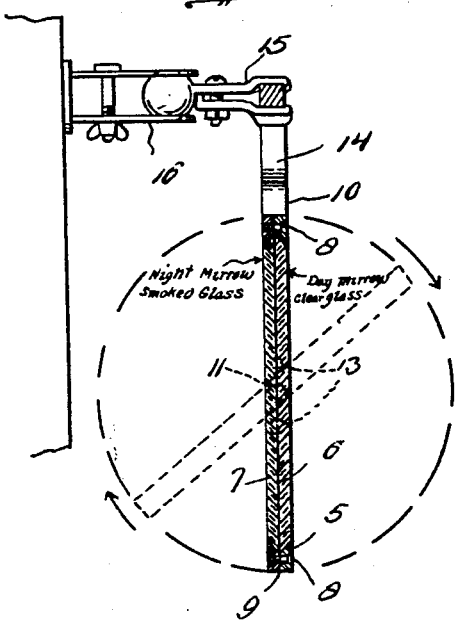
Figure 2 is a central vertical section thereof.
Figure 3:
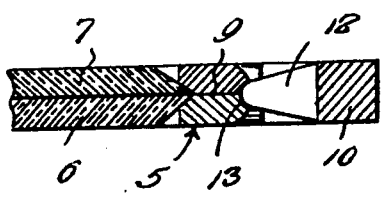
Figure 3 is an enlarged fragmentary section on line 3—3 of Figure 1.

For day use, the mirror 6 will be operatively disposed as shown, and for night use the mirror element will be manually swung to a reversed position, as indicated in Figure 2 for bringing the mirror 7 into service.

Minor changes may be made without departing from the spirit and scope of the invention as claimed.

What I claim as new is:

In a rear view mirror structure of the class described, a frame composed of a pair of duplicate sections separably fastened together, said frame sections being formed on their inner marginal edges to provide a substantially V-shaped endless groove, a pair of mirrors disposed in back to back contact and having beveled edge portions converging outwardly and seated in said groove, and means for adjustably supporting said frame on a relatively stationary support.

In testimony whereof I affix my signature.

JOHN EILAND.